Oct. 26, 1937.  E. F. LUNDGREN  2,097,285
VALVE
Filed Dec. 24, 1934  3 Sheets-Sheet 2
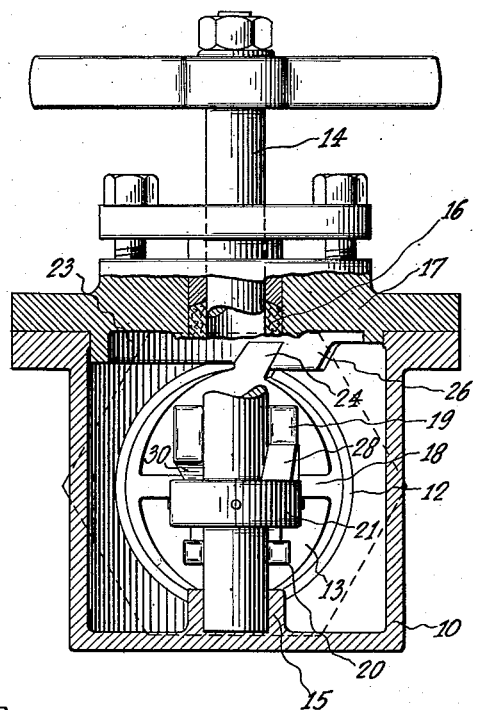
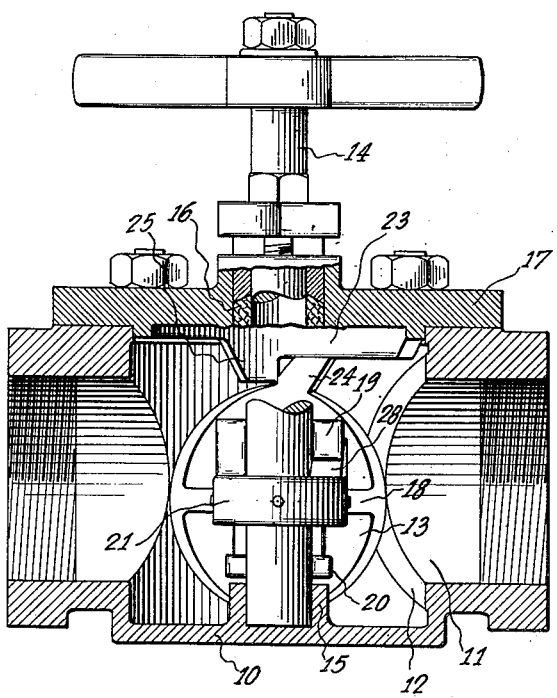
INVENTOR
Ernest F. Lundgren
BY
ATTORNEYS Oct. 26, 1937.  E. F. LUNDGREN  2,097,285
VALVE
Filed Dec. 24, 1934   3 Sheets-Sheet 3

INVENTOR
Ernest F. Lundgren
BY
ATTORNEYS

Patented Oct. 26, 1937

2,097,285

UNITED STATES PATENT OFFICE 2,097,285

VALVE

Ernest F. Lundgren, Brooklyn, N. Y.

Application December 24, 1934, Serial No. 758,881

4 Claims. (Cl. 251—102)

This invention relates to valves and more particularly to disc valves of the type described, for example, in my Patent No. 1,951,878, March 20, 1934, although it will be apparent from the following description that various features of the present invention are equally adaptable to other types of disc valves.

An object of this invention is to simplify and otherwise improve the construction of valves of this type, to provide a more rugged construction and to reduce the cost of manufacture.

This and other objects which will be apparent to those skilled in this particular art are accomplished by means of the invention illustrated in the accompanying drawings, in which, Fig. 1 is a transverse sectional view through a valve constructed in accordance with one embodiment of this invention, showing the parts in closed position;

Fig. 4 is a sectional view showing the valve disc and operating parts in elevation and in closed position;

Fig. 5 is a view similar to Fig. 1 showing the valve parts in open position;

The illustrated embodiment of this invention comprises a gate type valve in which a valve disc having a cylindrically curved face is loosely supported upon an operating valve rod which is adapted to completely open or close the valve port upon approximately one-quarter turn. A valve supporting collar upon the rod is formed so as to cooperate with a valve guide in causing the disc to slide across the valve seat in opening and closing, and when closed to press it against its seat with considerable pressure. Upon opening, the disc is pulled positively away from the valve seat and substantially one-quarter turn of the rod is sufficient to fully open the port.

Figure 7:
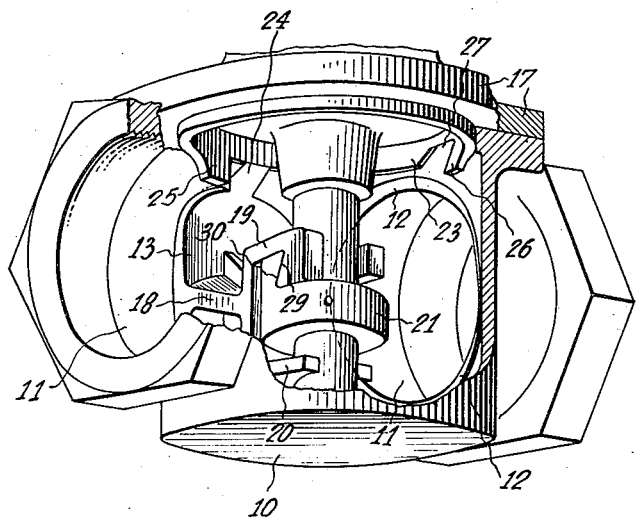
Fig. 7 is a similar view showing the valve parts in open position.

In the drawings, the invention is shown as comprising a housing 10 having a port 11, cylindrical valve seat 12 and valve disc 13 adapted to be moved into valve closing position, shown in Figs. 1, 2, 3, 4 and 6, and into valve opening position, shown in Figs. 5 and 7, by a valve rod 14 supported in a bearing 15 and extending upwardly through a conventional stuffing box 16 and bonnet 17.

The valve disc 13 is preferably connected to the valve rod in such a way as to be readily removed therefrom to permit easy assembling and disassembling of the parts. As illustrated, the disc is cast with an inwardly extending arm 18 provided with upper and lower forks 19 and 20, respectively, each of which embraces the valve rod 14 on opposite sides of a disc supporting collar 21 which is secured to the valve rod and movable therewith relatively to the valve disc 13. The collar has a cam surface 22 for engaging the adjacent face of the arm 18 and forcing the disc 13 against the valve seat 12 when in closed position.

The bonnet 17 is formed with a valve guide 23 the bottom face of which is engaged by the top face of a lug 24 formed on the valve disc 13. The opening movement of the valve disc is limited by a stop 25 on the guide 23 engaging the lug 24, as shown in Fig. 7. Closing movement of the valve is limited by a stop 26 having an inclined face adapted to cooperate with the inclined face of the lug 24, and a notch 27 is formed in the guide adjacent the closing stop 26 to permit movement of the valve disc upwardly in a direction transverse to the normal opening and closing movements of the disc, when the disc is in contact with the seat 12. This sliding movement of the gate is produced by relative movement between cam faces 28, see Figs. 1 and 6, formed on the collar 21 and one of the bifurcations of the top fork 19. It will be apparent that the faces of the inclined lug 24 and closing stop 26 also assist in producing this sliding movement of the valve on its seat. It will also be apparent that any tendency toward relative movement between the cam faces 28 during movement of the valve toward and from the seat 12 is prevented by engagement with the lug 24 of the bottom face of the valve guide 23.

Figure 1:
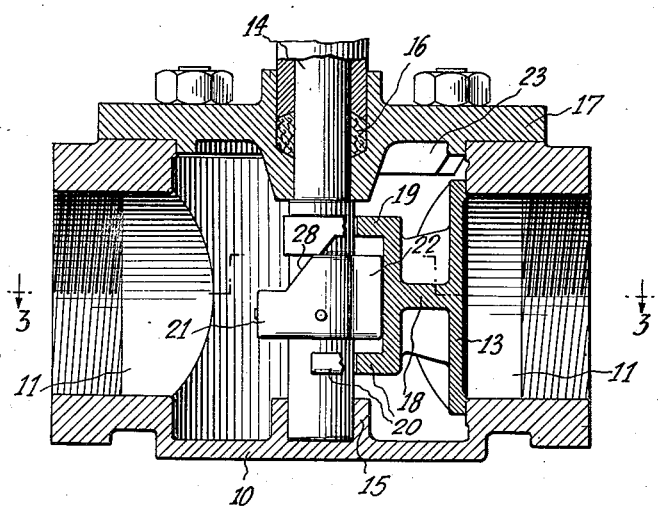
Figure 2:
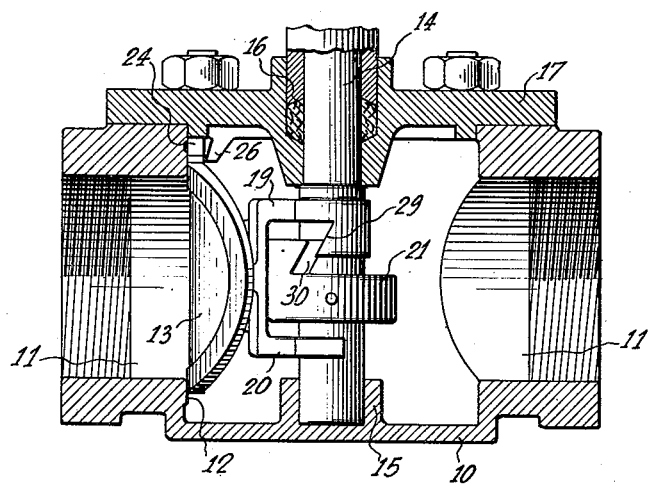
Fig. 2 is a similar view showing the operating parts when viewed from the opposite side of the valve.
Figure 3:
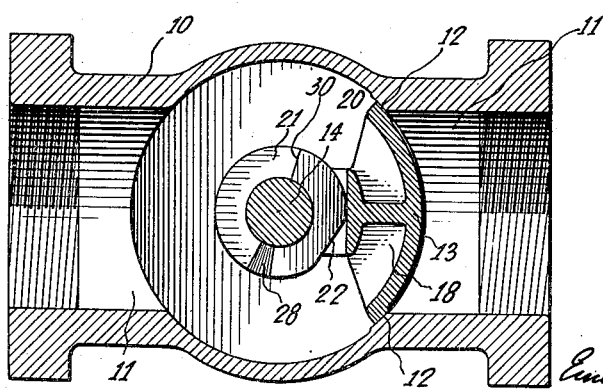
Fig. 3 is a transverse sectional view on the line 3—3 of Fig. 1.
Figure 6:
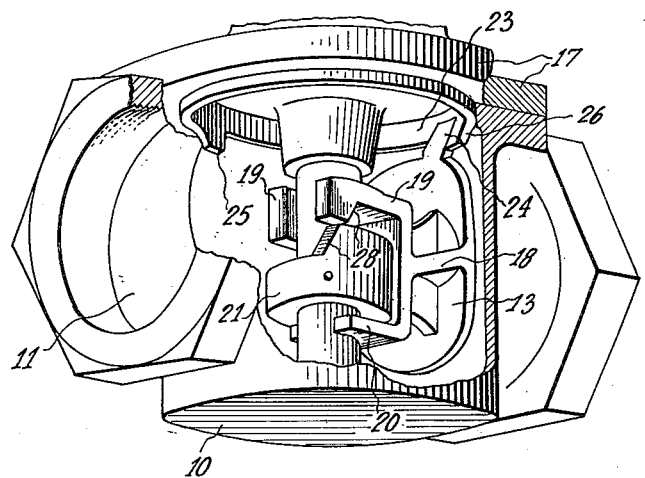
Fig. 6 is a perspective view of the interior of the valve taken from a plane below the valve housing and showing the valve parts in closed position.

The other bifurcation of the fork 19 has a cam face 29 formed on a re-entrant angle for cooperating with a similarly formed cam face 30 on the collar 21, see Figs. 2 and 7, to positively pull the valve disc away from the seat 13 and at the same time moving the disc downwardly to withdraw the lug 24 from the notch 27 in opening the valve by a reverse movement of the valve rod 14.

The lower fork 20 on the valve disc arm 18 bears loosely against the valve rod and assists in guiding the movements of and steadying the disc.

Assuming the valve to be fully opened with the parts in the relative positions shown in Figs. 5 and 7, closing of the valve is accomplished by rotating the valve rod to the right. In this position the cam faces 28 are in contact throughout their entire extent and movement of the rod produces similar movement of the rod supporting collar 21. Any relative movement between the cam faces 28 being prevented by engagement of the lug 24 with the lower face of the valve guide 23, the valve disc is compelled to move toward the valve seat 13 until the lug strikes the closing stop 26. In this position the lug is below the notch 27 and further movement of the collar 21 relative to the valve disc causes relative movement between the cam faces 28, raising the valve disc so as to both slide it laterally across the seat 12 and press it against the seat by means of the cam 22. In this position the valve is closed against the passage of fluid in either direction.

When closed, the valve parts are in the relative positions shown in Figs. 1, 2, 3, 4 and 6. To open the valve, the valve rod 14 and collar 21 are rotated to the left. This immediately shifts the cam 22 to relieve the valve disc of the closing pressure thereof. This movement, see Fig. 1, brings the cam faces 28 into register as well as the cam faces 29 and 30. Engagement of and relative movement between the latter cam faces positively pulls the disc laterally across the seat if there is any tendency for it to stick or be held thereon. At the same time relative movement between the cam faces 29 and 30 draws the valve disc downwardly and this movement is assisted by the inclination of the lug 24 and notch 27. When the disc has been lowered sufficiently to remove the lug entirely from the notch, the valve disc and cams have the relative positions shown in Fig. 7 and further rotation of the valve rod 14 moves the valve along the guide 23 until it strikes the opening stop 25, in which position the valve port is fully opened, even though the valve rod has only been moved about one-quarter of a turn.

The construction is such that frictional resistance to movement of the valve either in opening or closing is reduced to a minimum, even when the valve is employed in connection with high fluid pressures.

It will be apparent that the invention can be variously modified and adapted within the scope of the appended claims.

I claim:—

1. The combination in a valve of a housing having a port, a valve seat, a valve disc, a rod for moving said disc to open and close said port, a fork on said disc embracing said rod, a collar on said rod supporting said fork and disc, means for pressing said disc on said seat in closed position, cooperating surfaces on said collar and one bifurcation of said fork for moving said disc laterally across said seat during closing movement thereof, and cooperating surfaces on said collar and the other bifurcation of said fork for moving said disc laterally across said seat in the opposite direction during opening movement thereof.

2. The combination in a valve of a housing having a port, a valve seat, a valve disc, a rod for moving said disc to open and close said port, a fork on said disc embracing said rod, a collar on said rod supporting said fork and disc, a cam surface on said collar for pressing said disc against said seat in closed position, cooperating surfaces on said collar and one bifurcation of said fork for moving said disc laterally across said seat during closing movement thereof, and cooperating surfaces on said collar and the other bifurcation of said fork for moving said disc laterally across said seat in the opposite direction during opening movement thereof.

3. The combination in a valve of a housing having a port, a valve seat, a valve disc, a rod for moving said disc to open and close said port, a fork on said disc embracing said rod, a collar on said rod supporting said fork and disc, means for pressing said disc on said seat in closed position, cooperating surfaces on said collar and one bifurcation of said fork for moving said disc laterally across said seat during closing movement thereof, and cooperating surfaces on said collar and the other bifurcation of said fork for moving said disc laterally across said seat in the opposite direction during opening movement thereof, said last named surfaces being arranged to pull said disc away from said seat.

4. The combination in a valve of a housing having a port, a valve seat, a valve disc, a rod for moving said disc to open and close said port, a fork on said disc embracing said rod, a collar on said rod supporting said fork and disc, a cam surface on said collar for pressing said disc against said seat in closed position, cooperating surfaces on said collar and one bifurcation of said fork for moving said disc laterally across said seat during closing movement thereof, and cooperating surfaces on said collar and the other bifurcation of said fork for moving said disc laterally across said seat in the opposite direction during opening movement thereof, and a second rod-engaging fork on said disc for guiding the movement of said disc.

ERNEST F. LUNDGREN.